United States Patent [19]

Van Gilst

[11] 4,165,683

[45] Aug. 28, 1979

[54] BARBECUE APPARATUS

[75] Inventor: Carl Van Gilst, Goshen, Ind.

[73] Assignee: Innovative Industries, Inc., Goshen, Ind.

[21] Appl. No.: 875,319

[22] Filed: Feb. 6, 1978

[51] Int. Cl.² .......................................... A47J 37/08
[52] U.S. Cl. .................................................. 99/393
[58] Field of Search .................. 99/339, 393–399, 99/402, 421 R, 421 A, 421 P, 421 H, 427, 443, 444, 446; 126/25 R, 25 AA

[56] References Cited

U.S. PATENT DOCUMENTS

| | | | |
|---|---|---|---|
| 2,826,981 | 3/1958 | Chick | 99/397 |
| 3,103,161 | 9/1963 | Whitehead | 99/427 |
| 3,363,543 | 1/1968 | Roberts et al. | 99/421 R |
| 3,769,901 | 11/1973 | Phillips | 99/444 |

*Primary Examiner*—Leonard D. Christian

*Attorney, Agent, or Firm*—Marmaduke A. Hobbs

[57] ABSTRACT

A barbecue apparatus intended primarily for outdoor use, in which two side panels and two end panels form a generally rectangular shaped body with an open top and bottom, and a rotatable grill is supported by the upper edge of the two end members in the upper part of said body consisting of two sections for holding meat therebetween. A basket or other elongated retainer is disposed in the bottom of the body for holding burning fuel for cooking the meat, and a lid, preferably hinged to the upper edge of one of the side panels of the body, closes the body while the meat is cooking to provide effective radiation of heat onto the meat and to direct the hot gases on and around the meat. The body and lid are preferably constructed of stainless steel which provides a reflective inner surface for directing the heat from the burning fuel onto the meat while the lid is in its closed position.

7 Claims, 5 Drawing Figures

BARBECUE APPARATUS

It is a common practice to barbecue large pieces of meat, such as a whole or half hog, on a spit over a pit of burning charcoal, wood or other fuel, the pits often being merely trenches in the ground and the spit mounted thereabove on posts on either side or at either end of the trench. Various types of portable barbecue units have been devised and tried, some of them mounted on a chase or other type of wheeled vehicle, for transporting from one location to another, such as picnics, county fairs, and camping sites, but most of these have had certain inherent disadvantages which have made them inconvenient to use, or which made them unable to cook the meat satisfactorily or make it as delicious as it was capable of being prepared. Some of these prior barbecue cookers have been gas fired, and others have used charcoal, but one of the primary difficulties has been burning of the meat by flames from the fuel and/or from the grease dripping from the meat onto the fuel or burners. Further, some of the outdoor barbecue units are difficult to transport from one location to another and sometimes require disassembly and reassembly between operations, and are difficult to maintain in a sanitary condition. It is therefore one of the principal objects of the present invention to provide a barbecue cooker which is so constructed and designed that the amount of grease dripping from the meat onto the fire is minimized so that the roasting of the meat is performed mostly by the direct radiation and hot gases from charcoal or other fuel without flames reaching the meat, and which includes a hood having an inner surface which reflects the radiation from the fire onto the meat to provide effective and efficient heating on all sides of the meat throughout the cooking operation.

Another object of the present invention is to provide a barbecue cooker in which the meat is supported over the fire in a grill that can be easily and intermittently rotated to cook the meat uniformly, and which requires a minimum amount of charcoal or other fuel to properly cook and prepare the meat for serving.

Still another object of the invention is to provide a barbecue cooker which is easily maintained in a sanitary condition, and readily transportable from one location to another, and includes an attached cover over the fire box which substantially encloses the meat while it is cooking, but which opens wide to permit easy access to the grill and to permit the grill to be easily and conveniently mounted on and removed from the fire box.

A further object is to provide a barbecue cooker of the aforesaid type which is simple in construction and operation, and which is versatile in performance, and can be satisfactorily used for preparing a variety of different kinds and cuts of meat, either singly or together in one operation.

Additional objects and advantages of the present invention will become apparent from the following description and accompanying drawings, wherein.

Figure 1:
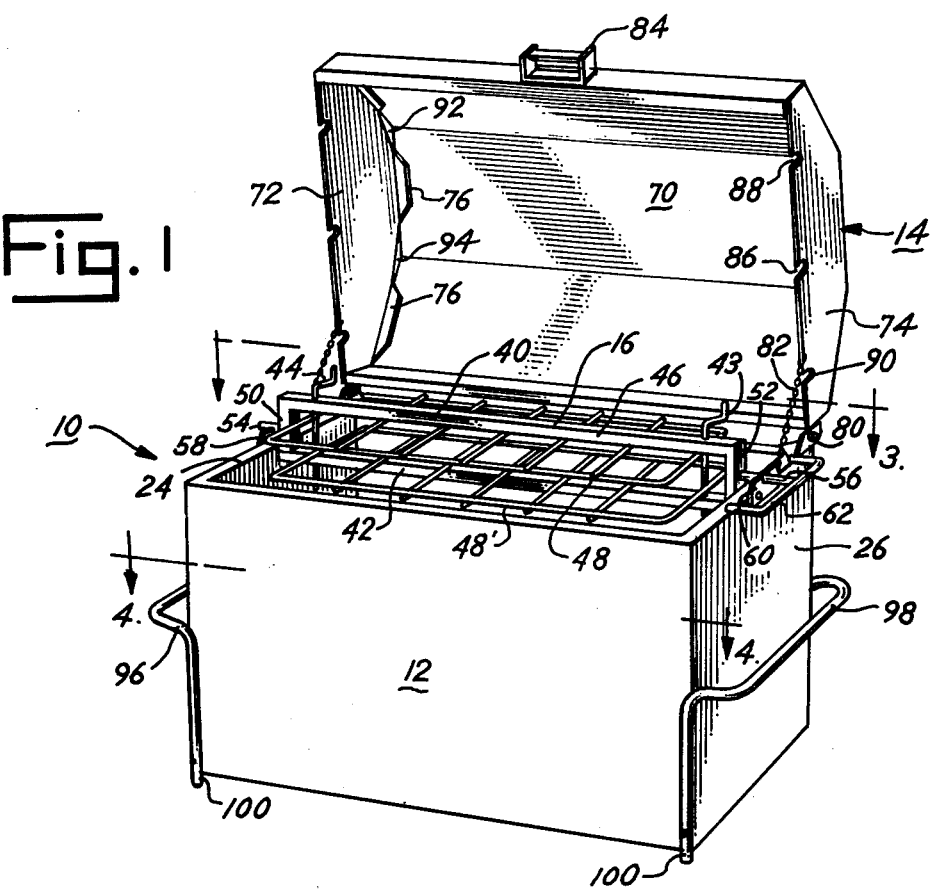
FIG. 1 is a perspective view of an outdoor barbecue apparatus, showing the barbecue apparatus with the lid in open position.
Figure 2:
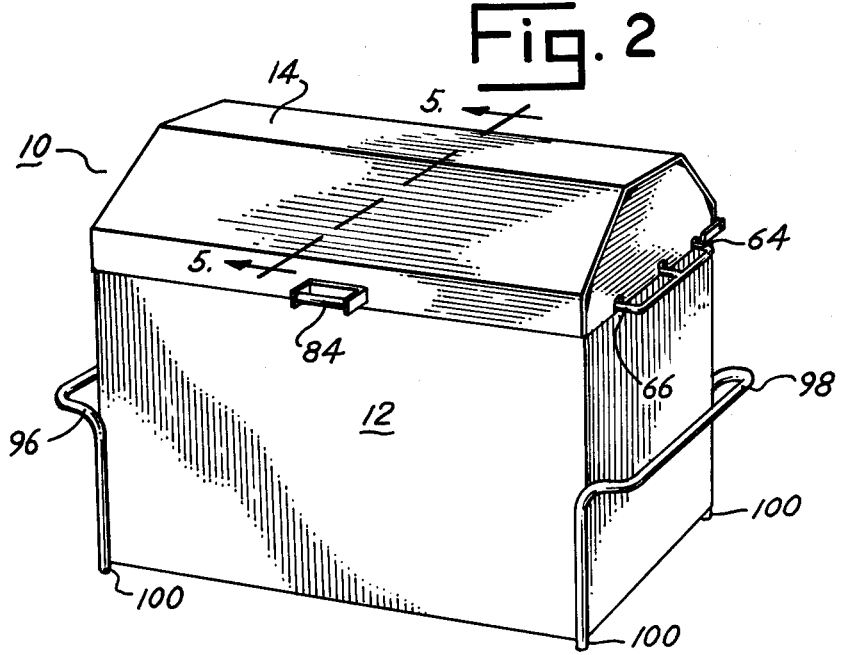
FIG. 2 is a perspective view of the barbecue apparatus, showing the lid in the closed position.

Referring more specifically to the drawings and to FIGS. 1 and 2 in particular, numeral 10 designates generally an outdoor barbecue apparatus embodying the present invention, and numeral 12 indicates the body of the barbecue apparatus, 14 a lid pivoted to one of the longitudinal sides of the body, and 16 indicates a rotatable grill mounted on and supported by body 12. The present apparatus is designed primarily for outdoor use, and is intended to efficiently barbecue whole hogs and other large masses of meat; however, it is readily adaptable to relatively small pieces of meat such as chicken, turkey and various cuts of pork, beef and lamb.

The body consists of two side panels 20 and 22 and two end panels 24 and 26 joined to the vertical edges of the side panels to form a relatively rigid rectangular body or fire box. The side and end panels are preferably constructed of stainless steel, and form a sturdy structure for supporting the grill and meat when a fire is in the body. A pair of horizontal members 28 and 30 connect opposite corners of the body to retain the body in a rectangular cross sectional position. Except for cross members 28 and 30, the bottom is preferably open so that drippings from the meat being cooked will fall directly on the ground or on some absorbent material placed under the apparatus. Air for the fire in the body of the barbecue apparatus is primarily admitted through the open bottom along the lower edges of the body panels. A pair of expanded metal baskets 32 and 34 of rectangular shape are placed in the bottom of space or pit 36 in the body and are filled with charcoal, wood or other suitable fuel for cooking the meat in the grill. The baskets may be rigidly attached to the body or may merely be set in the pit on cross members 28 and 30. Since the baskets are expanded metal, they readily admit air to the burning charcoal or other fuel in the baskets so that the fuel burns efficiently throughout the cooking operation.

Figure 3:
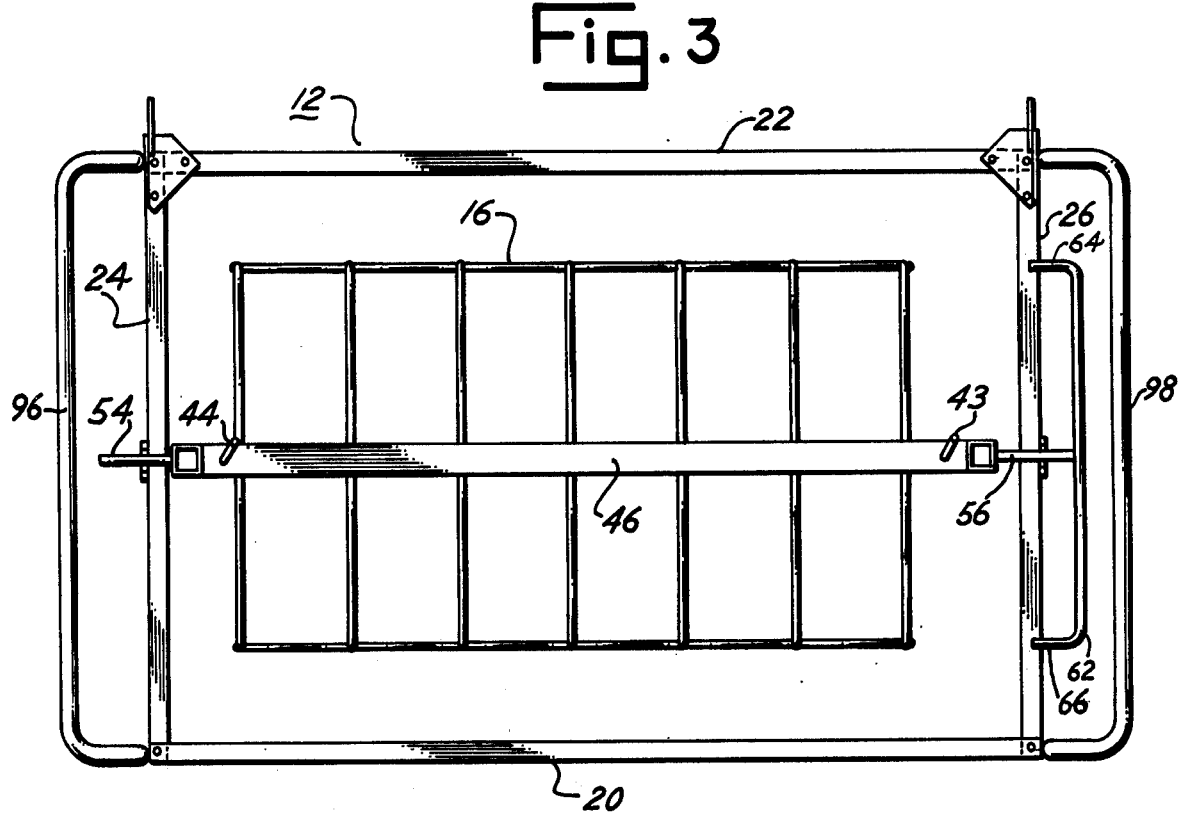
FIG. 3 is a top plan view of the body or fire box of the barbecue apparatus shown in FIGS. 1 and 2.
Figure 4:
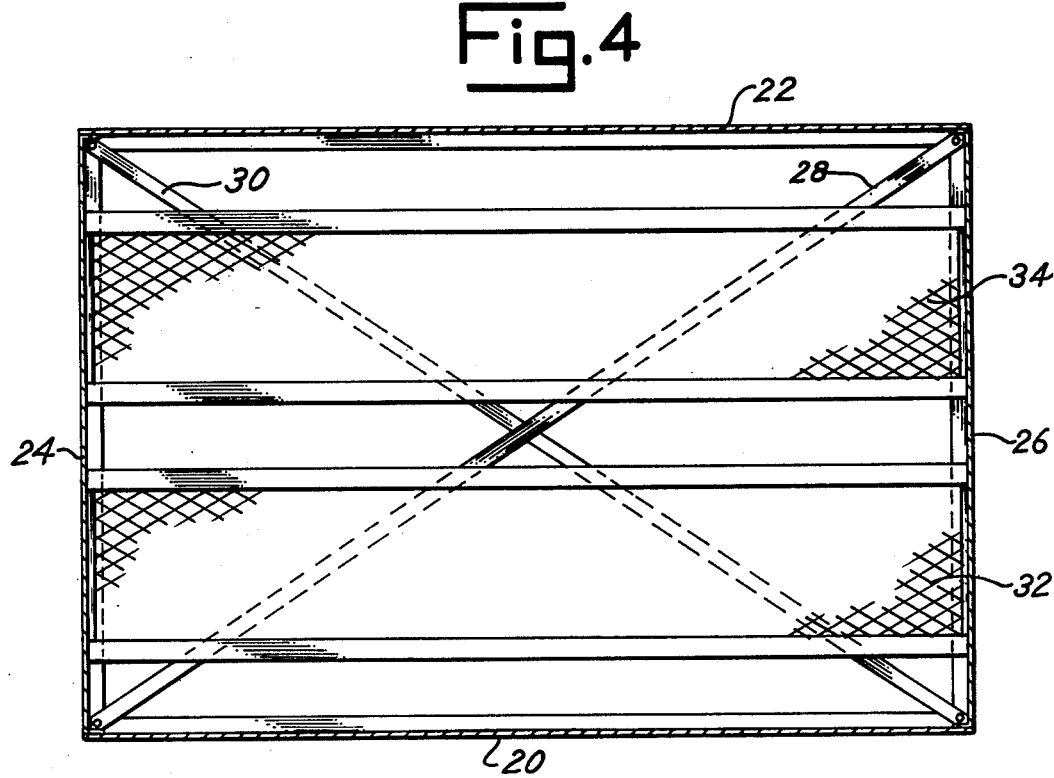
FIG. 4 is a horizontal cross sectional view of the body of the apparatus, the section being taken on line 4—4 of FIG. 1.
Figure 5:
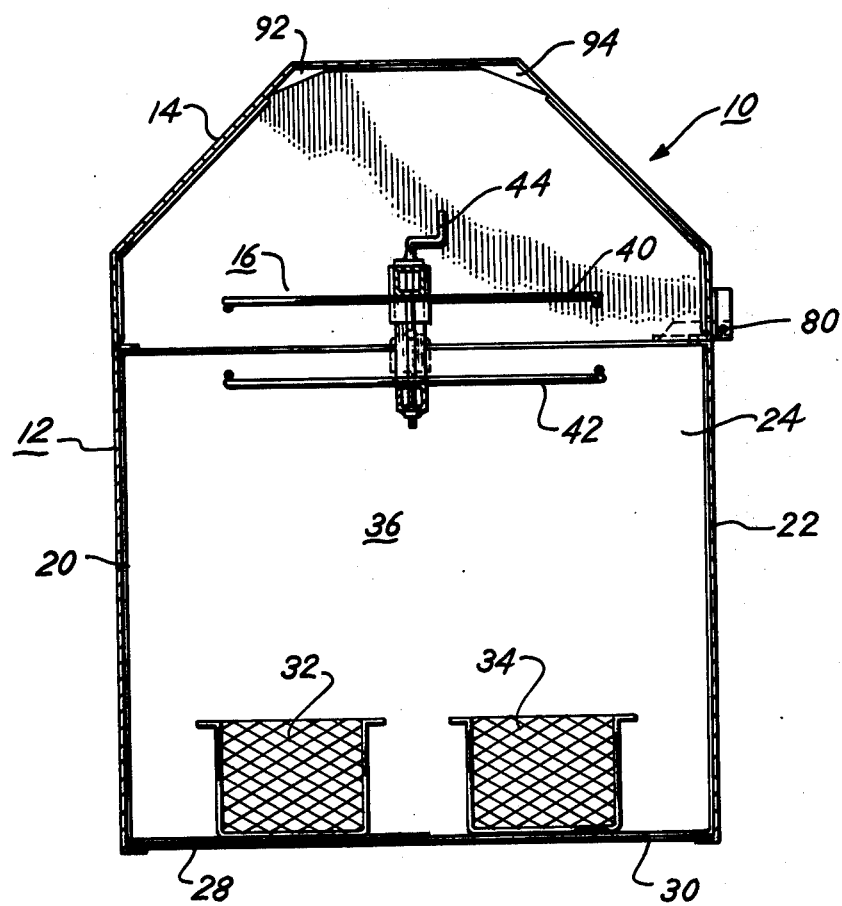
FIG. 5 is a vertical cross sectional view of the barbecue apparatus as shown in the preceding figures, the section being taken on line 5—5 of FIG. 2.

The grill 16 consists of two half sections 40 and 42 held together by screws 43 and 44 extending through section 40 into section 42, the two screws being threaded into the latter section. Each section consists of a longitudinal bar 46 and a grill member 48 secured rigidly to the longitudinal bar, and the two sections are maintained in aligned relationship with one another by telescopic posts 50 and 52. The grill is supported on shafts 54 and 56 at opposite ends of the grill in brackets 58 and 60, the two brackets being secured on the outside surface of the upper edges of end panels 24 and 26 and provided with a V or U-shaped groove for receiving the respective shafts. A handle 62 is attached to the outer end of shaft 56 and is provided with inwardly extending fingers 64 and 66 which normally rest on the upper edge of panel 26, as shown in FIGS. 1 and 3, and hold the grill in a fixed position; however, the grill is slidable endwise sufficiently to disengage the two fingers from the upper edge of the panel so that the grill can be rotated with one of the fingers passing downwardly along the outer surface of panel 26. After the grill has been rotated, for example, half a revolution, the grill is slid endwise in the opposite direction to return the fingers to their latching position on the upper end of panel 26. A hog or other large piece of meat is placed between the two grills 48 and 48', and the screws are tightened to clamp the meat assembly in place between the two grill sections. After the meat has been placed in the grill, the grill is then mounted on the body with shafts 54 and 56 seated in the slots in fixtures 58 and 60, and with fingers 64 and 66 engaging the upper edge of panel 26 to prevent accidental rotation of the grill.

Lid 14 consists of a top 70 and end walls 72 and 74 joined to the edges of top 70 by flanges 76, and is connected to body 12 by a hinge 80 at the rear side of the body, thus permitting the lid to be pivoted to an elevated position as shown in FIG. 1. A chain 82 or other restraining device is preferably used to hold the lid in a substantially over-center upright position so that it will stay open along the backside of the body. A handle 84 is preferably attached to the forward edge of the lid to assist in opening the lid, and a plurality of notches 86, 88 and 90 are provided in the lower edge of end wall 74 to permit the end wall to fit over shaft 56 and fingers 64 and 66 of handle 62 when the fingers are in engagement with the upper edge of panel 26. The lid is provided with a plurality of smoke openings 92 and 94 between the upper edge of each of the two walls 72 and 74 and the adjacent edge of top 70.

Corresponding notches are also provided in the lower edge of panel 72 to receive shaft 54 and permit the grill to be placed in either direction on body 12. The lid is preferably constructed of stainless steel, and hence will deflect a substantial amount of heat downwardly onto the meat when the lid is in closed position, and the hot gases from the charcoal or other fuel will circulate around the meat before leaving the apparatus through the openings 92 and 94 at each end of the lid, thus providing an efficient cooking of the meat with a minimum amount of fuel.

Since the present device is portable, handles 96 and 98 are secured to the opposite ends of the body so that the assembled barbecue apparatus can be easily lifted and placed on a vehicle for transporting the apparatus from one operating location to another. The bars forming the handles extend downwardly and are secured to the front and rear panels and project below the lower edge of the body to provide short legs 100 to support the body in a slightly elevated position above the ground or other supporting surface.

In the operation of the present barbecue apparatus, a suitable location is selected where the apparatus will sit firmly on the ground or other fireproof supporting surface, and the lower extensions of the handles forming legs 100 hold the body in spaced relation to the ground or other supporting surface so that sufficient air for combustion of the fuel is admitted into the fuel space of the body. The amount of air can be easily controlled by placing an obstruction in front along the openings, since the openings are relatively long and narrow and can be easily controlled by varying the space between the lower edge of the four panels forming the body and the ground or other supporting surface. The hog or other meat is clamped between the two sections 40 and 42 of the grill, and the two sections are secured together by screws 43 and 44, thus holding the two sections of the grill firmly in place with the meat, such as a whole hog, therebetween. The charcoal or other suitable fuel is placed in baskets 32 and 34, and after effective coals have been obtained, the grill is placed on the body with shafts 54 and 56 seated in slots in fixtures 58 and 60. With the fingers 64 and 66 resting on the upper edge of panel 26, the lid is closed, thus providing effective heating of the entire mass of meat by the hot gases and the radiation of the heat from the fuel and from the reflective surfaces of the side walls of the body and the internal walls of the lid. When the roast is to be turned, handle 62 is pulled to move the entire grill endwise until fingers 64 and 66 are disengaged from the upper edge of panel 26. With the grill and handle in this position, the grill can be easily rotated, for example, half a turn, and held in that position by moving the grill and handle to their original position with fingers 64 and 66 in engagement with the upper edge of panel 26. During cooking, the grease and other juices from the meat drip downwardly, usually falling onto the ground or other absorbent surface below and on either side of the fire in the two baskets 32 and 34; thus, since only a small amount of grease is burnt, the flavor of the meat is not substantially affected by the smoke therefrom. After the meat is fully cooked, the grill can be easily lifted from the two fixtures and from the body to any other suitable support for loosening screws 43 and 44 to separate the two sections 40 and 42 and permit removal of the meat from the grill. The operation may be repeated, normally after refueling the fire in the baskets.

In the event smaller pieces of meat are to be cooked than could be supported separately by the grill as shown, small baskets, preferably of stainless steel, containing the smaller pieces of meat such as cuts of beef, pork and pieces of chicken and turkey, are placed in the grill between the two sections and the grill is used in the same manner as with the large pieces of meat. The grill can be used if desired in some operations with the lid open so that the cooking can be readily observed and the grill rotated as required. It is thus seen that the present barbecue apparatus is simple and effective in barbecuing or otherwise cooking meat of various sizes and shapes and, in view of the reflection of the heat and the restricted flow of gases from the apparatus when the lid is closed, efficient cooking is obtained with the minimum amount of fuel.

While only one embodiment of the present barbecuing apparatus has been described in detail herein, various changes and modifications may be made without departing from the scope of the invention.

I claim:

1. A barbecue apparatus comprising a generally rectangular body having two side panels, two end panels and an open top, a rotatable grill having longitudinally movable shafts at opposite ends extending outwardly over said end panels and having two sections for holding meat therebetween, elongated retainer means disposed near the bottom for holding burning fuel, a lid mounted on said body and having an arched top and two end panels, said lid having an opening therein for escape of smoke and hot gases, and a means for manually rotating said grill when said lid is in either its closed or open position, said last mentioned means having a handle with a finger which engages the upper edge of one of said body end panels for holding the grill in an adjusted position, and a pair of screws extending through one grill section into the other section for releasably holding the sections together.

2. A barbecue apparatus as defined in claim 1 in which said body is open at the bottom throughout substantially the full cross sectional area thereof.

3. A barbecue apparatus as defined in claim 2 in which relatively short legs are provided on said body for holding said body above a supporting surface to provide an opening for air for burning the fuel in said body.

4. A barbecue apparatus as defined in claim 1 in which a hinge means pivotally secures said lid to the upper rear edge of said body.

5. A barbecue apparatus as defined in claim 1 in which an opening is provided in said lid at each end thereof.

6. A barbecue apparatus as defined in claim 1 in which said body and said lid are constructed of stainless steel having internal surfaces which reflect the heat therefrom onto meat held by said grill.

7. A barbecue apparatus as defined in claim 2 in which handles are provided at each end for moving the apparatus and in which two elongated fuel retainer means are disposed in the bottom of the body in side-by-side relationship.

* * * * *